May 8, 1951 R. S. NORTON 2,551,964

VARIABLE CAPACITY INTEGRATOR

Filed Jan. 13, 1950

Inventor

RALPH S. NORTON

By H. L. Mackey

Attorney

Patented May 8, 1951

2,551,964

UNITED STATES PATENT OFFICE 2,551,964

VARIABLE CAPACITY INTEGRATOR

Ralph S. Norton, Brooklyn, N. Y., assignor to General Precision Laboratory Incorporated, a corporation of New York Application January 13, 1950, Serial No. 138,353

6 Claims. (Cl. 318—558)

This invention relates to an integrator for integrating a varying electrical input quantity and relates more particularly to apparatus in which variations in the input quantity are utilized to derive a feedback signal which is equal and opposite in sense to the instantaneous values of the input quantity. Integration of the feedback signal variations gives the integral of the input quantity.

The primary object of the invention is to provide an improved integrator which is extremely sensitive, simple and which achieves high precision with inexpensive components.

Specifically, the present invention utilizes a resistance-capacity network as the basic time standard or integrating network. An extremely high gain amplifier, the input of which is connected to this integrating network, controls suitable motor means which in turn controls the feedback energy or signal which is impressed on the integrating network in opposition to the variable input quantity; the operation of the motor means necessary to provide the proper feedback signal also being utilized to control a utilization device, which may be an integrator or other indicating device, and which can be calibrated in terms of the integral of the input quantity. The motor controlled means in this specific instance, controls the sense and value of the instantaneous electrical quantity supplied to the input circuit in accordance with the rate of deviation of the input signal.

As will be readily appreciated, the present inventive concept may be used in a large number of applications, such as electrical computing machines, computers for navigational systems, combat training devices and the like.

Figure 1:
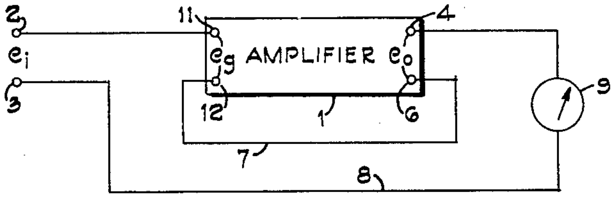
Figure 2:
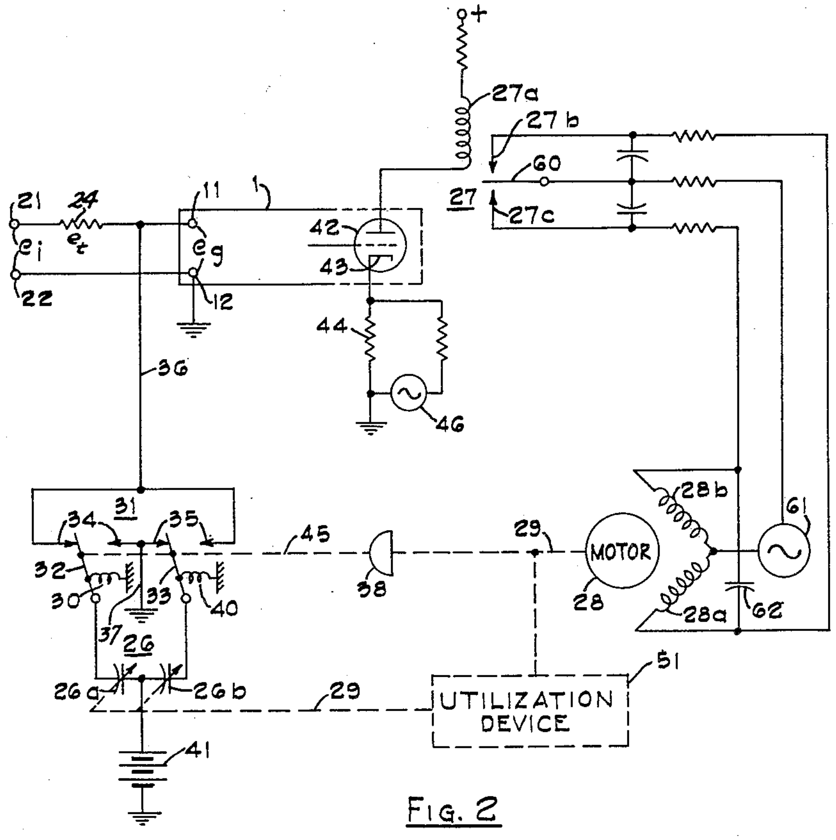

The exact nature of the invention and other and further objects will be readily apparent from the following description when considered in connection with the attached drawings in which:

Figure 1 is a simplified diagrammatic diagram illustrating the principles of the present invention; and Figure 2 is a diagrammatic diagram illustrating one embodiment of the present invention.

The fundamental components and the manner of operation are illustrated in Fig. 1. This figure shows a high gain amplifier 1 provided with input terminals 2 and 3 on which a variable input electrical quantity which is to be integrated, may be impressed. The electrical quantity impressed on input terminals 2 and 3 is designated by the symbol $e_i$. The amplifier 1 provides an output at terminals 4 and 6 which is represented by the symbol $e_o$. Suitable means are provided for connecting the output of the amplifier 1 into one side of the input circuit. This feedback circuit is represented by the connections 7 and 8. A suitable indicating device 9 in the feedback connection, which indicating means may be of the recording type, may be utilized to integrate the energy output from the amplifier 1. The phase of the electrical output from the amplifier is such that it opposes any change in value of the signal arriving at the input terminals 2 and 3 of the amplifier. The instantaneous value of the net input signal to the terminals 11 and 12 of amplifier 1 is indicated by $e_g$.

The amplifier 1 is of the direct current type and the relationship between the input and output voltages can be represented:

$$e_o = e_i \frac{\mu}{\mu + 1} \qquad (1)$$

where $\mu$ is the amplification factor; $e_i$ is the input signal voltage; and $e_o$ is the output voltage.

The above brief discussion will be helpful in understanding the specific embodiment of the invention which is illustrated in Fig. 2 which discloses a device which is essentially a velocity servo designed to give a mechanical output by means of a rotating shaft, the amount of the rotation of the shaft being utilized to indicate the integral of the input electrical quantity. It will, of course, be readily apparent that the integral of the input quantity can be determined directly by a device which is responsive to the output of the amplifier 1.

Referring specifically to Fig. 2 the electrical input quantities, or electrical quantities proportional thereto, which are to be integrated, are impressed on the input terminals 11 and 12 of the amplifier 1 through an integrating network comprising the resistor 24 and capacitive means 26, the latter comprising two variable condensers $26_a$ and $26_b$. The output of the amplifier 1, through a suitable relay 27, controls the direction and speed of rotation of a motor 28 which in turn controls the rotation of the condensers $26_a$ and $26_b$, thereby varying the capacity of the capacitive means 26 in such a manner as to oppose the instantaneous changes in the input quantities in the manner generally mentioned above. It is to be understood that the speed of rotation of the motor 28 is proportional to the level of the energy output of the amplifier 1. Through a suitable mechanical connection such as the shaft 29 and appropriate gearing the variable condensers $26_a$ and $26_b$ are rotated to vary their respective capacities in the same sense simultaneously. The two condensers having their plates fixed to the shaft 29 and displaced approximately 180° with respect to each other are used instead of a single condenser because in practice it is not practical to provide a single condenser which has a linear capacity characteristic throughout 360°. Accordingly, suitable switch means 31 are provided for alternately connecting the condensers $26_a$ and $26_b$ into the input circuit of the amplifier 1 in timed relation with the linear portions of the characteristic curves of the condensers $26_a$ and $26_b$.

This switch means 31 comprises a pair of movable switch blades or armatures 32 and 33 associated, respectively, with pairs of fixed contacts 34 and 35. One of each of the pairs of fixed contacts 34 and 35 are connected through a common conductor 36 to the input terminal 11 of the amplifier 1. The other fixed contacts of each pair 34 and 35 are connected through a common conductor 37 to ground. The armatures 32 and 33 are biased in one direction by suitable springs 39 and 40, respectively. In order to make certain that the respective condensers $26_a$ and $26_b$ are connected into the input circuit to the amplifier 1 during only the linear portion of their characteristic curve, a suitable cam 38, driven from the shaft 29 and engaging a rod or shaft 45, is provided for alternating the switch blades 32 and 33 into engagement with the left and right hand fixed contacts 34 and 35, it being understood that the cam 38 is so adjusted that the respective condensers $26_a$ and $26_b$ will be connected only during the linear portion of the characteristic to the input circuit of the amplifier and when they are not connected to the input circuit of the amplifier they will be grounded through the conductor 37. For approximately a half revolution of the cam 38, the left hand switch contacts 34 and 35 are engaged by the armatures 32 and 33 while during the remaining half revolution the right hand contacts 34, 35 are engaged by the movable contacts 32 and 33.

A suitable source of constant potential, such as a battery 41, is connected between a point electrically common to one side of each of the respective condensers $26_a$, $26_b$ and ground. This source of potential is provided for the purpose of supplying charging current to the resistance-capacitance integrating network which includes the capacitance means 26 and the resistor 24.

The high gain amplifier 1 referred to herein has such an extremely high gain over its range of operation that the voltage at its input across the terminals 11 and 12 remains substantially at zero because of the feedback action described above. This amplifier 1 is of the type described in copending application Serial No. 51,610, filed September 28, 1949, by John W. Gray and accordingly the details thereof are not included in this specification.

If the potential $e_g$ tends to change in the positive direction an increasing output $e_o$ from the amplifier 1 will cause the motor 28 to change the speed of rotation of the condenser $26_a$ and $26_b$ in the positive direction thereby changing the rate of change of value of capacitance 26 to restore the balance and maintain the potential $e_g$ at zero. Conversely, a tendency for the potential $e_g$ to change in the negative direction will result in a reduction of the amplifier output and a corresponding change in the speed and direction of rotation of motor 28 and change in the value of the capacitance 26, again restoring the balance.

The general operation of the integrating network and its associated amplifier 1, which provides the appropriate servo power and integral, may be described mathematically, as follows:

The general condenser equation is $$Q=CV \qquad (2)$$

where

Q is the total charge on condenser C
C=value of the capacitance and
V=voltage across C.

Differentiating Equation 2

$$\frac{dQ}{dt}=C\frac{dv}{dt}+V\frac{dc}{dt} \qquad (3)$$

Since $$\frac{dQ}{dt}=i$$

and V is constant $$i=V\frac{dc}{dt} \qquad (4)$$

Applying the general condenser Equation 2 to the illustrated embodiment of the present invention, the capacitance C corresponds to the instantaneous value of one of the condensers $26_a$ or $26_b$, whichever happens to be connected into the integrating network at the instant; V is the potential of the battery 41; $i$ corresponds to the current through the resistor 24; and R represents the value of the resistor 24. When the motor 28 rotates the rotors of the condensers $26_a$ and $26_b$, the capacitance in the integrating network changes causing a change in current described by Equation 4. This current $i$ must flow through the resistor 24 because, as mentioned above, the potential across terminals 11, 12 remains constant. This voltage is represented as $$e_t=iR \qquad (5)$$

and the sense of this voltage drop $e_t$ is such as to oppose the instantaneous values of the input variable electrical quantity represented by the voltage $e_i$ between terminals 21 and 22. The voltage $e_g$ appearing at the terminals 11 and 12 then becomes $e_g=e_i-e_t$. From Equation 1 and from the previous discussion, it is seen that $e_i \cong e_t$, and therefore $$e_t=e_i\frac{\mu}{\mu+1} \qquad (6)$$

where $\mu$ is $$\frac{e_t}{e_g}$$

and represents the total gain of the amplifier and the automatic feedback network controlled by the motor. If $\mu$ is very large, $e_t$ becomes substantially equal to $e_i$. From Equations 4 and 5 we find $$\frac{dc}{dt}=\frac{e_t}{RV} \qquad (7)$$

Assuming that the relationship between the rate of change of the capacitor means 26 and its angular velocity is linear, $$\omega=K\frac{dc}{dt} \qquad (8)$$

where $\omega$ equals the velocity in rad./sec., and therefore $$\omega=\theta/t$$

since K=constant, and substituting from Equations 7 and 8 then $$\omega=\frac{ke_t}{RV} \quad (9)$$

and $$\theta\Big]_0^t=\frac{K}{RV}\int_0^t e_t dt \quad (10)$$

since $e_t=e_i$, then $$\theta\Big]_0^t=\frac{K}{RV}\int_0^t e_i dt \quad (11)$$

Equation 11 shows that the total rotation of the shaft is proportional to the integral of the input voltage over a given time interval.

Preferably the current $i$ through the resistance 24 and the capacitance 26 should be of the order of magnitude 1.0 microampere and preferably not any less than 0.1 of a microampere since the grid current of the amplifier may be of the order of 0.01 microampere or less. The voltage of the battery 41 may be of the order of 500 volts.

In explaining the present invention, it is necessary to show only the output stage of the amplifier 1 and the general arrangement of the motor control system. This output stage comprises a triode 42 which energizes the relay 27 in accordance with the magnitude of the plate current. The relay 27 comprises an actuating coil $27_a$, spring armature movable contact 60 and fixed contacts $27_b$ and $27_c$. The latter fixed contacts are connected, respectively, to one end of the individual field windings $28_a$ and $28_b$ of the motor 28, the latter being a single phase capacitor type motor which is supplied from a suitable alternating current source 61. One side of the source 61 is connected directly to a point common to one end of each of said field windings; a condenser 62 being connected between the respective ends of the windings $28_a$ and $28_b$ to which the respective fixed contacts $27_a$ and $27_b$ are connected. It will be readily apparent from the above description that the rotation of the motor 28 will be determined by the engagement of the movable contact 60 with either of the fixed contacts $27_b$ and $27_c$. It will also be readily apparent that the speed and direction of the motor 28 can be controlled by causing the movable contact 60 to vibrate continuously between the two fixed contacts $27_b$ and $27_c$ and causing the contact 60 to dwell longer on one fixed contact than the other. This provides a very sensitive control of motor speed and direction To this end, the cathode 43 of the triode 42 has impressed thereon an alternating current bias which is provided by the resistance drop through a cathode resistor 44 which is energized from a constant alternating current source 46. The circuit parameters are such and the movable contact 60 is so biased that when there is a certain signal input applied to the power output tube 42, the fluctuations of the anode current thereof through the actuating coil $27_a$ are such as to cause the movable contact 60 alternately to engage the fixed contacts $27_b$ and $27_c$ for equal lengths of time as the anode current fluctuates under control of the alternating current bias produced by the potential drop across resistor 44. However, when the signal potential is increased and the average anode current is also increased the movable contact 60 will be caused to dwell longer in engagement with the fixed contact $27_b$, for example, then with the other fixed contact $27_c$. It will be seen from the circuit diagram in Fig. 2 that when movable contact 60 engages fixed contact $27_b$ the phase of the current in the field coil $28_b$ will lead the current in the field coil $28_a$ by reason of the condenser 62, thereby determining one direction of rotation of motor 28, while the motor 28 will rotate in the opposite direction when the movable contact 60 is in engagement with the fixed contact $27_c$, which will cause the current therethrough to lag the current through field coil $28_a$. This motor control system is described in greater detail in the aforementioned copending application. Also, the so-called "memory" circuit and system disclosed in said application could also be applied to the present invention.

If desired, a suitable counter or recorder, depending upon the use to which the present invention may be adapted, may be operated directly by the current in the anode circuit of the tube 42, or, alternatively, a utilization device 51 actuated by the motor 28 may be utilized to indicate a quantity which is proportional to the time integral of the variable input electrical quantity supplied to the terminals 11 and 12.

From the foregoing description it will be seen that the present invention provides an improved integrating device which is simple, accurate and inexpensive and wherein a relative large integral energy output is provided. This makes it feasible to merely indicate the integral or to control other apparatus in accordance with the integral.

Although a specific embodiment has been illustrated and described, it is to be understood that many variations from the specific embodiment may be made without departing from the scope of the invention concept.

What is claimed is:

1. In a device for integrating a variable input electrical potential, capacitive means connected to have impressed thereon an electrical quantity proportional to said variable electrical potential, said capacitive means comprising two condensers mechanically connected together and arranged to simultaneously change their capacities in the same direction, a separate source of constant potential, switch means for alternately connecting said condensers individually across said input terminals and in series with said source of constant potential, an amplifier having its input connected across said capacitive means, motor means connected to the output of said amplifier operative at a speed and in a direction dependent upon the level of the energy output thereof and means operatively associated between said motor means and said condensers for controlling the latter to produce a rate of change of charge on the alternate condenser which is connected across said amplifier which is in opposition to the rate of change of charge produced by said variable input potential.

2. In a device for integrating a variable input electrical quantity, an impedance connected to have said variable input electrical quantity impressed thereon, capacitive means connected to said impedance whereby said capacitance means is charged by the current through said impedance, means for varying the capacity of said capacitive means at a rate proportional to and in opposite sense to the rate of variation of said variable input electrical quantity, said means for controlling the capacity of said capacitance means comprising an amplifier responsive to the instantaneous values of said input electrical quantity.

3. In a device for integrating a variable input electrical quantity, variable capacity means, conductive means for charging said capacitive means at a rate equal to said input quantity and in one sense or the opposite sense depending on whether the input quantity is of one sense or the opposite sense, a source of electrical energy for supplying a charge to said capacitive means independent of said input quantity, means for varying said variable capacitive means for controlling the charging thereof from said independent source at a rate substantially equal and opposite to the instantaneous rate of charging by said input quantity, said control means comprising a velocity servo loop including an amplifier, the output of which is a direct function of the input quantity, and a motor controlled by said amplifier, said servo having such a speed characteristic that said motor is rotated at such speeds and in such a direction as to vary said capacitive means so that the rate of charging of said capacitive means from said independent source is substantially equal and opposite to the instantaneous rate of charging produced by the input quantity and the amount of rotation of said motor over a period of time constitutes the integral of the varying input quantity over that period of time.

4. In a device for integrating a variable input electrical potential, variable capacitive means having input terminals on which said variable input potential is to be impressed, an amplifier having a substantially infinite gain connected to said input terminals, and means controlled by said amplifier constituting a negative feedback circuit for varying the value of said capacitive means at such a rate as to vary the rate of change of charge in said capacitive means in magnitude and sense equal and opposite to the rate of change of potential of said variable input electrical potential, said means for varying said capacitive means including a velocity servomotor having such a speed characteristic that said motor rotates at a speed and direction having a linear relation to the instantaneous output of said amplifier, and a utilization circuit having means responsive to the output of said amplifier for indicating the integral of said variable input electrical potential.

5. In a device for integrating a variable input electrical potential, variable capacitive means having input terminals on which said variable input potential is to be impressed, an amplifier having a substantially infinite gain connected to said input terminals, and means controlled by said amplifier constituting a negative feedback circuit for varying the value of said capacitive means at such a rate as to vary the rate of change of charge in said capacitive means in magnitude and sense equal and opposite to the rate of change of potential of said variable input electrical potential, said capaciitve means including at least two condensers the capacities of which are simultaneously varied in the same direction, means for connecting said condensers alternately across the input of said amplifier, said means for varying said capacitive means including a velocity servomotor having such a speed characteristic that said motor rotates at a speed and direction having a linear relation to the instantaneous output of said amplifier, and a utilization circuit having means responsive to the output of said amplifier for indicating the integral of said variable input electrical potential.

6. In a device for integrating a variable input electrical potential, variable capacitive means having input terminals on which said variable input potential is to be impressed, an amplifier having a substantially infinite gain connected to said input terminals, and means controlled by said amplifier constituting a negative feedback circuit for varying the value of said capacitive means at such a rate as to vary the rate of change of charge in said capacitive means in magnitude and sense equal and opposite to the rate of change of the potential of said variable input electrical potential, said capacitive means including at least two condensers mechanically connected together to vary their capacities simultaneously in the same direction, switch means for alternately connecting said condensers across the input of said amplifier and for grounding the terminal of said condenser not connected to said amplifier input, said means for varying said capacitive means including a velocity servomotor having such a speed characteristic that said motor rotates at a speed and direction having a linear relation to the instantaneous output of said amplifier, and a utilization circuit having means responsive to the output of said amplifier for indicating the integral of said variable input electrical potential.

RALPH S. NORTON.

REFERENCES CITED

The following references are of record in the file of this patent:

UNITED STATES PATENTS

| Number | Name | Date |
|---|---|---|
| 2,251,973 | Beale | Aug. 12, 1941 |

OTHER REFERENCES

"An All Electric Integrator for Solving Differential Equations," Varney (Review of Scientific Instruments), pages 10–16. Jan. 1942.

"Analysis of Problems in Dynamics by Electronic Circuits," Ragazzini et al. (I.R.E. Proceedings, volume 35, No. 5) pages 444–452. May, 1947.

"Electronic Instruments," Greenwood, Holdam, MacRae Mit Radiation Lab. Series No. 21; published McGraw-Hill Book Co., pages 83–86. 1948.

"Elements of D.-C.," Korn (Electronics), pages 122–127. April 1948.

"Design of D.-C. Electronic Integrator," Korn (Electronics) pages 124–126. May 1948.

"Compact Analog Computer," Frost (Electronics) pages 116–120, 122. July 1948.

"A Voltage Integrator," Bussell et al. (Review of Scientific Instruments, volume 19, No. 10) pages 688–692. Oct. 1948.

"Electronic Time Measurement," Chance, Hulsizer, MacNichol, Williams; Mit Radiation Lab. Series No. 20; published McGraw-Hill Book Co., Inc., pages 305–308. 1949.